United States Patent
Kompalli et al.

(10) Patent No.: US 10,294,153 B2
(45) Date of Patent: *May 21, 2019

(54) MODIFIED CEMENT TILE ADHESIVE AND GROUT

(71) Applicant: LATICRETE INTERNATIONAL, INC., Bethany, CT (US)

(72) Inventors: Rajeswari Kompalli, Bethany, CT (US); Randall P. Bright, Naugatuck, CT (US); Christoph Hahner, Bad Homburg (DE); Karoline Cartee, Beacon Falls, CT (US)

(73) Assignee: Laticrete International, Inc., Bethany, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/019,991

(22) Filed: Jun. 27, 2018

(65) Prior Publication Data

US 2018/0312434 A1 Nov. 1, 2018

Related U.S. Application Data

(62) Division of application No. 14/719,739, filed on May 22, 2015, now Pat. No. 10,029,944.

(60) Provisional application No. 62/001,954, filed on May 22, 2014.

(51) Int. Cl.
| | |
|---|---|
| *C04B 7/32* | (2006.01) |
| *C04B 28/06* | (2006.01) |
| *C04B 103/10* | (2006.01) |
| *C04B 111/00* | (2006.01) |
| *C04B 111/70* | (2006.01) |

(52) U.S. Cl.
CPC ............... *C04B 7/32* (2013.01); *C04B 28/06* (2013.01); *C04B 28/065* (2013.01); *C04B 2103/10* (2013.01); *C04B 2111/00112* (2013.01); *C04B 2111/00637* (2013.01); *C04B 2111/00689* (2013.01); *C04B 2111/70* (2013.01); *Y02W 30/97* (2015.05)

(58) Field of Classification Search
CPC ......... C04B 7/32; C04B 28/06; C04B 28/065; C04B 2103/10; C04B 2111/00112; C04B 2111/00637; C04B 2111/00689; C04B 2111/70

See application file for complete search history.

(56) References Cited

U.S. PATENT DOCUMENTS

| | | | |
|---|---|---|---|
| 5,269,845 | A | 12/1993 | Grunau et al. |
| 6,827,776 | B1 | 12/2004 | Boggs et al. |
| 6,869,987 | B2 | 3/2005 | Mills et al. |
| 8,950,928 | B2 | 2/2015 | Nakashima et al. |
| 10,029,944 | B2 * | 7/2018 | Kompalli ............... C04B 22/10 |
| 2006/0118006 | A1 | 6/2006 | Amathieu |
| 2014/0343194 | A1 | 11/2014 | Taquet et al. |

FOREIGN PATENT DOCUMENTS

| | | |
|---|---|---|
| EP | 0081385 A1 | 6/1983 |
| EP | 0722917 A1 | 7/1996 |
| EP | 1614670 A2 | 1/2006 |
| EP | 2172437 A1 | 4/2010 |
| EP | 2431341 A1 | 3/2012 |
| EP | 2679560 A2 | 1/2014 |
| EP | 2716615 A1 | 4/2014 |
| FR | 2918055 A1 | 1/2009 |
| WO | 2011015508 A1 | 2/2011 |
| WO | 2013086722 A1 | 6/2013 |
| WO | 2013093344 A1 | 6/2013 |

\* cited by examiner

*Primary Examiner* — Anthony J Green

(74) *Attorney, Agent, or Firm* — DeLio, Peterson & Curcio, LLC; Kelly M. Nowak

(57) ABSTRACT

Methods of formulating, premixed cement-based tiling compositions and application of such premixed cement-based tiling compositions as an adhesive or grout. The premixed cement-based tiling compositions include a premixed cementitious formulation having a pH and an alkali activation constituent. The premixed cementitious formulation includes an aluminous or a calcium aluminate cement slurry in an amount of about 35 wt. % to 50 wt. % in combination with one or more filler or modifier materials present in an amount of about 40 wt. % to 65 wt. %. The alkali activation constituent destabilizes the premixed cementitious formulation by increasing the pH thereof to generate a reaction between the premixed cementitious formulation and the alkali activation constituent resulting in the cement-based tiling composition for use as an adhesive or a grout. The alkali composition may be sodium hydroxide supersaturated with lithium carbonate.

16 Claims, 2 Drawing Sheets

*Table 1- CTA Formulation*

| Raw Material | Range, % |
|---|---|
| Silica Sand Filler | 40-60 |
| Calcium Aluminate Slurry | 35-50 |
| Cellulose Ether | 0-0.45 |
| Defoamer | 0-0.1 |
| Fibers/Rheological modifiers | 0-2 |
| Recycled Light weight Filler | 0-15 |
| Biocide | 0-0.02 |
| In-can preservative | 0.001-0.002 |
| Clays/Thickeners | 0-1 |
| Redispersible polymer powder | 0-10 |
| Superplasticizers | 0-2 |

FIG. 1A

*Table 2 – Grout Formulation*

| Raw Material | Range, % |
|---|---|
| Silica Sand Filler | 40-55 |
| Calcium Aluminate Slurry | 35-50 |
| Cellulose Ether | 0-0.45 |
| Defoamer | 0.01-0.2 |
| Fibers/Rheological modifiers | 0-2 |
| Recycled Light weight Filler | 0-15 |
| Biocide | 0-0.02 |
| In-can preservative | 0.001-0.002 |
| Clays/Thickeners | 0-1 |
| Redispersible polymer powder | 0-3 |
| Superplasticizers | 0-2 |
| Inorganic Pigments | 0-4 |
| Inorganic Fillers (Limestone) | 0-10 |
| Water Repellant | 0-2 |

FIG 1B.

Plot 1:

Plot 2:

MODIFIED CEMENT TILE ADHESIVE AND GROUT

PRIORITY

This application is a divisional application claiming priority to U.S. patent application Ser. No. 14/719,739 filed May 22, 2015 now U.S. Pat. No. 10,029,944, which claims the benefit of U.S. Provisional Application Ser. No. 62/001,954 filed on May 22, 2014.

BACKGROUND OF THE INVENTION

1. Field of the Invention

The present invention is directed to ready to use cement-based compositions, and in particular, to cement-based compositions formulated as grouts and/or adhesives suitable for use as a Ceramic Tile Adhesive (CTA) or as a tile grout to fill spaces between ceramic tiles or mosaics after installation.

2. Description of Related Art

Cementitious or cement-based compositions are often formulated as grouts and adhesives. Conventional cement-based grouts are available in a variety of colors as dry, pigmented, one part systems to which water needs to be added just before application. Conventional preblended CTA materials typically come in two colors and supplied in bags of various sizes. A predetermined quantity of water needs to be added and the product mixed just before application.

CTA's and cement grouts can further be differentiated as rapid and/or regular setting materials. Setting typically refers to the time to traffic after application. The performance and setting characteristics are directly related to the composition of the formulations. Most CTA's and grouts based on conventional Portland cement compositions result in regular setting materials. Grouts and adhesives based on aluminous or calcium aluminate cements result in products with faster set times and thereby quicker time to traffic. While formulations comprising both of the above chemistries may be formulated to provide a more tailored set time, it is calcium aluminate based cements that are typically preferred for faster strength development and quicker walk over times.

Known CTA's and cement grouts are bagged materials that need to be mixed with water on the job site at the time of application. The material must be well blended and typically requires some sort of mechanical mixer. Due to the nature of the material, it can also be a relatively dusty operation. In some cases, clean water is not available on the jobsite, resulting in the use of contaminated water, thereby deleteriously affecting the final properties of the dried product. Availability of clean water becomes particularly challenging when the job sites are high rise buildings or construction sites in remote locations.

In view of the foregoing, the market is moving towards ready to use materials that are premixed and do not require the additional water to be used. The primary advantage of the ready to use grouts and/or CTA's is their ease of use. The products are premixed and can be used with minimal preparation and no additional water required on site. They are also much less hazardous since they are wet and do not generate dust when used.

There continues to be a need for new and improved premixed grouts and adhesives for which the present invention provides a solution thereto.

SUMMARY OF THE INVENTION

Bearing in mind the problems and deficiencies of the prior art, it is therefore an object of the present invention to provide ready to use premixed cement-based compositions.

Another object of the present invention is to provide premixed, ready to use cement-based compositions formulated for use as grouts and adhesives that require no additional water.

It is another object of the present invention to provide ready to use premixed grouts and adhesives that are easy to use in installation procedures.

A further object of the invention is to provide ready to use premixed grouts and adhesives that require minimal preparation prior to use thereof.

It is yet another object of the present invention to provide ready to use premixed grouts and adhesives having reduced hazardous health risks.

Another object of the present invention is to provide ready to use premixed grouts and adhesives that are cost efficient and provide strong, durable dried products.

Still other objects and advantages of the invention will in part be obvious and will in part be apparent from the specification.

The above and other objects, which will be apparent to those skilled in the art, are achieved in the present invention which is directed to a cement-based tiling composition for use as an adhesive or grout that includes a premixed cementitious formulation having a pH, and an activation constituent. The premixed cementitious formulation includes a cement slurry in an amount of about 35 wt. % to less than 50 wt. % in combination with at least one filler material present in an amount of about 40 wt. % to about 65 wt. % based on a total weight of the formulation. The activation constituent destabilizes the premixed cementitious formulation by increasing the pH thereof to generate a reaction between the premixed cementitious formulation and the activation constituent resulting in the cement-based tiling composition for use as an adhesive or a grout.

In one or more embodiments the premixed cementitious formulation has a neutral pH, which may be increased to a pH at or above 11, preferably by an activation constituent having a pH at or above 11. The cement slurry of the premixed cementitious formulation may include an aluminous cement slurry or a calcium aluminate cement slurry. The cement slurry may be present in an amount of about 35 wt. % to about 50 wt. % in combination with one or more filler materials present in an amount of about 40 wt. % to about 65 wt. % based on a total weight of the premixed cementitious formulation. The one or more filler materials may include a silica sand filler present in an amount of about 40 wt. % to about 60 wt. % and a light weight filler present in an amount of about 0 wt. % to about 15 wt. %.

The premixed cementitious formulation may further include one or more of the following additives selected from the group consisting of fillers, thickeners, defoamers, surfactants, modifiers, biocide, preservatives, and plasticizers. The activation constituent may be an alkali composition, which may be sodium hydroxide saturated with lithium carbonate in solution. Preferably the alkali composition may be a solution of sodium hydroxide saturated with lithium carbonate, with the sodium hydroxide present in the solution from about 3-15%, and the lithium carbonate present in the solution from about 2-8%.

The premixed cementitious formulation may further include one or more of the following additives selected from the group consisting of thickeners, defoamers, surfactants, modifiers, biocide, preservatives, and plasticizers. The premixed cementitious adhesive composition may be a premixed cementitious adhesive composition for use in tiling, or it may be a premixed cementitious grout composition for use in tiling.

In other embodiments the invention is also directed to cement-based tiling compositions for use as an adhesive or grout consisting essentially of a premixed cementitious formulation having a pH and an alkali activation constituent. The premixed cementitious formulation includes an aluminous or a calcium aluminate cement slurry in an amount of about 35 wt. % to about 50 wt. % in combination with one or more filler or modifier materials present in an amount of about 40 wt. % to about 65 wt. % based on a total weight of the formulation. The alkali activation constituent destabilizes the premixed cementitious formulation by increasing the pH thereof to generate a reaction between the premixed cementitious formulation and the alkali activation constituent resulting in the cement-based tiling composition for use as an adhesive or a grout. The alkali composition may be sodium hydroxide present in the solution from about 3-15%, and saturated with lithium carbonate present in the solution from about 2-8%.

The invention is also directed to cement-based tiling compositions for use as an adhesive or grout consisting only of: a premixed cementitious formulation having a pH, the premixed cementitious formulation including an aluminous or a calcium aluminate cement slurry in an amount of about 35 wt. % to about 50 wt. % in combination with one or more filler or modifier materials present in an amount of about 40 wt. % to about 65 wt. % based on a total weight of the formulation; and an alkali activation constituent that destabilizes the premixed cementitious formulation by increasing the pH thereof to generate a reaction between the premixed cementitious formulation and the alkali activation constituent resulting in the cement-based tiling composition for use as an adhesive or a grout. The alkali composition may be sodium hydroxide present in the solution from about 3-15%, and saturated with lithium carbonate present in the solution from about 2-8%.

Still further the invention is directed to cement-based tiling compositions consisting essentially of a premixed cementitious formulation and an activator solution that destabilizes the premixed cementitious formulation by increasing the pH thereof to provide the cement-based tiling composition comprising a premixed cementitious adhesive composition for use in tiling. In these embodiments the premixed cementitious formulation includes: silica sand filler in an amount of about 40 to 60 wt. %, a cement slurry (of aluminous cement slurry or calcium aluminate cement slurry) in an amount of about 35 to less than 50 wt. %, cellulose ether in an amount of about 0 to 0.45 wt. %, defoamer in an amount of about 0 to 0.1 wt. %, polymer fibers in an amount of about 0 to 2 wt. %, a second filler being a recycled light weight filler in an amount of about 0 to 15 wt. %, biocide in an amount of about 0 to 0.02 wt. %, in-can preservative in an amount of about 0.001 to 0.002 wt. %, clays and/or thickeners in an amount of about 0 to 1 wt. %, redispersible polymer powder in an amount of about 0 to 10 wt. %, and superplasticizers in an amount of about 0 to 2 wt. %. The alkali composition may be sodium hydroxide present in the solution from about 3-15%, and saturated with lithium carbonate present in the solution from about 2-8%.

The invention is directed to cement-based tiling compositions consisting essentially of a premixed cementitious formulation and an activator solution that destabilizes the premixed cementitious formulation by increasing the pH thereof to provide the cement-based tiling composition comprising a premixed cementitious grout composition for use in tiling. In these embodiments the premixed cementitious formulation includes: silica sand filler in an amount of about 40 to 55 wt. %, calcium aluminate slurry in an amount of about 35 to 50 wt. %, cellulose ether in an amount of about 0 to 0.45 wt. %, defoamer in an amount of about 0.01 to 0.2 wt. %, fibers/rheological modifiers in an amount of about 0 to 2 wt. %, recycled light weight filler in an amount of about 0 to 15 wt. %, biocide in an amount of about 0 to 0.02 wt. %, in-can preservative in an amount of about 0.001 to 0.002 wt. %, clays and/or thickeners in an amount of about 0 to 1 wt. %, redispersible polymer powder in an amount of about 0 to 3 wt. %, superplasticizers in an amount of about 0 to 2 wt. %, inorganic pigments in an amount of about 0 to 4 wt. %, inorganic fillers in an amount of about 0 to 10 wt. %, and water repellant in an amount of about 0 to 2 wt. %. The alkali composition may be sodium hydroxide present in the solution from about 3-15%, and saturated with lithium carbonate present in the solution from about 2-8%.

The invention is also directed to a grout composition that includes a cement formulation having a pH; and an activation constituent that destabilizes the cement formulation by increasing the pH thereof to generate a reaction between the cement formulation and the activation constituent resulting in the grout composition. The cement formulation may have a neutral pH, or a pH increased to a pH at or above 11. The cement formulation may be a premixed formulation having a cement slurry such as a premixed calcium aluminate based cement slurry, a calcium aluminate based cement slurry, or an aluminous based cement slurry.

The cement formulation may further include one or more of the following additives: fillers, thickeners, defoamers, surfactants, modifiers, biocide, preservatives, plasticizers, and the like. The activation constituent may be an alkali composition. This activation constituent may be sodium hydroxide saturated with lithium carbonate in solution. The alkali composition may be a variety of different alkali compositions each having a different pH.

In other embodiments the invention is directed to a tile adhesive that includes a cement formulation having a pH; and an activation constituent that destabilizes the cement formulation by increasing the pH thereof to generate a reaction between the cement formulation and the activation constituent resulting in the grout composition. The cement formulation may have a neutral pH, or a pH increased to a pH at or above 11. The cement formulation may include a premixed cement slurry such as a premixed calcium aluminate based cement slurry, a calcium aluminate based cement slurry, or an aluminous based cement slurry.

The cement formulation may further include one or more of the following additives: fillers, thickeners, defoamers, surfactants, modifiers, biocide, preservatives, plasticizers, and the like. The activation constituent may be an alkali composition. This activation constituent may be sodium hydroxide saturated with lithium carbonate in solution. The alkali composition may be a variety of different alkali compositions each having a different pH.

The invention is also directed to methods of formulating grout compositions by providing a cement formulation having a pH, and providing an activation constituent. Prior to use of the grout composition, the activation constituent is mixed with the cement formulation whereby the activation constituent destabilizes the cement formulation and increases its pH to generate a reaction between the cement formulation and the activation constituent resulting in the grout composition. In these methods the cement formulation may have a neutral pH, or a pH increased to a pH at or above 11. The cement formulation may include a premixed cement slurry such as a premixed calcium aluminate based cement slurry, a calcium aluminate based cement slurry, or an aluminous based cement slurry.

The cement formulation may further include one or more of the following additives: fillers, thickeners, defoamers, surfactants, modifiers, biocide, preservatives, plasticizers, and the like. The activation constituent may be an alkali composition. This activation constituent may be sodium hydroxide saturated with lithium carbonate in solution. The alkali composition may be a variety of different alkali compositions each having a different pH.

Still further the invention is directed to methods of formulating tile adhesive compositions by providing a cement formulation having a pH, and providing an activation constituent. Prior to use of the grout composition, the activation constituent is mixed with the cement formulation whereby the activation constituent destabilizes the cement formulation and increases its pH to generate a reaction between the cement formulation and the activation constituent resulting in the grout composition. In these methods the cement formulation may have a neutral pH, or a pH increased to a pH at or above 11. The cement formulation may include a premixed cement slurry such as a premixed calcium aluminate based cement slurry, a calcium aluminate based cement slurry, or an aluminous based cement slurry.

The cement formulation may further include one or more of the following additives: fillers, thickeners, defoamers, surfactants, modifiers, biocide, preservatives, plasticizers, and the like. The activation constituent may be an alkali composition. This activation constituent may be sodium hydroxide saturated with lithium carbonate in solution. The alkali composition may be a variety of different alkali compositions each having a different pH.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIGS. 1A-B are tables showing exemplary premixed calcium aluminate cement formulations suitable for use in the cement-based adhesive and/or grout compositions in accordance with one or more embodiments of the invention.

DESCRIPTION OF THE PREFERRED EMBODIMENT(S)

Figure 2:
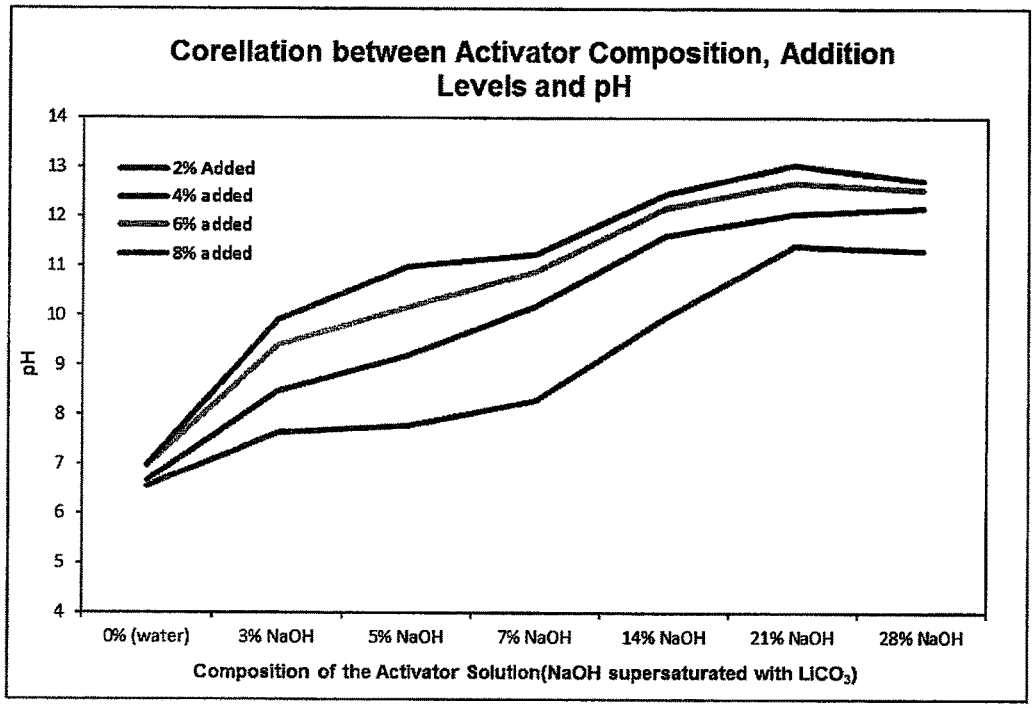
FIG. 2 is a plot showing correlation between an activator composition, addition levels and the raise in pH.

In describing the preferred embodiment of the present invention, reference will be made herein to FIGS. 1-3 of the drawings in which like numerals refer to like features of the invention.

The embodiments of the present invention can comprise, consist of, and consist essentially of the features and/or steps described herein, as well as any of the additional or optional ingredients, components, steps, or limitations described herein or would otherwise be appreciated by one of skill in the art. It is to be understood that all concentrations disclosed herein are by weight percent (wt. %.) based on a total weight of the composition unless otherwise indicated.

The present invention refers to the use of a unique, ready to use formulation, suitable for use as an adhesive (e.g., a Ceramic Tile Adhesive "CTA") or as a tile grout, filling spaces between ceramic tiles or mosaics after installation. The various embodiments of the invention relate to application of a stabilized cement formulation as a grout or CTA. The compositions utilize a formulated two part system. In one or more embodiments the invention is directed to activation of the present formulated cements to perform as a CTA/grout that meets appropriate ANSI standards for a grout (ANSI A118.7) or a CTA ANSI A118.15.

In accordance with the invention, one or more embodiments are directed to cement-based tiling compositions formulated for use as grouts and adhesives. As used herein the term "tiling compositions" refers to the present cement-based compositions suitable for use as an adhesive to adhere tile to a substrate, or as a grout to fill spaces between tiles or mosaics after installation. These cementitious compositions include formulating a stabilized aluminous or calcium aluminate based cement slurry into a premixed adhesive (e.g., CTA) or a grout. Advantageously, these adhesive and grout compositions are ready to use formulations. To obtain the necessary performance attributes, the premixed adhesive and/or grout formulations need to be activated on site just before application thereof. Upon activation, it has been found that the adhesive and/or grout behave like conventional aluminous or calcium aluminate cement based formulas with respect to application, workability, strength development and time to traffic.

The various premixed cement-based compositions of the invention are two-component part formulations that include both a premixed aluminous or calcium aluminate cement formulation and an activator solution. The premixed aluminous or calcium aluminate cement formulation and activator solution are mixed together, just prior to use thereof, to render the various cement-based compositions of the invention formulated as adhesives and/or grouts.

The first component of the present two-part formulations is the premixed aluminous or calcium aluminate cement formulation. This premixed cement formulation may include an aluminous or calcium aluminate cement slurry, fillers, thickeners and other modifiers such as defoamers, surfactants and the like. In one or more embodiments other adhesive and/or grouting constituents or compositions may also be included within the present compositions to provide desired adhesive and/or grouting properties. These various premixed aluminous or calcium aluminate formulations may be provided as thick materials or solutions that are shelf stable and do not lose rheological behavior when stored in a container over long periods of time.

In accordance with the various embodiments, the premixed cement formulations/compositions may include an aluminous or calcium aluminate cement slurry. In one or more preferred embodiments the premixed cement formulation is a premixed calcium aluminate cement slurry. The aluminous or calcium aluminate cement slurry may be present in an amount of about 35 wt. % to about 50 wt. %, based on a total weight of the premixed cement composition. An exemplary aluminous and/or calcium aluminate cement slurry suitable for use in the present formulations may be that of the stabilized aluminous or calcium aluminate cement slurry as described in the patent publication number WO 2013093344 A1 by Pascal Taquet et al., which is herein incorporated by reference in its entirety.

The premixed cement formulations also include filler materials. The filler materials may be present in an amount of about 40 wt. % to about 65 wt. %, based on a total weight of the premixed cement composition. These filler materials may include silica sand filler present in an amount of about 40 wt. % to about 60 wt. %, as well as a light weight filler present in an amount of about 0 wt. % to about 15 wt. %. Exemplary silica sand fillers include, but are not limited to, fine silica, limestone (calcium carbonate), various minerals, reflective particles, glass, colored beads, dyes, pigments, and combinations thereof. The light weight filler may be, for instance, recycled light weight glass filler.

The thickeners of the premixed cement formulations/compositions may include clays and/or other thickeners to provide the resultant slurry with the desired viscosity and/or density. These clays and/or thickeners may be present in an amount of about 0 wt. % to about 1.45 wt. %, based on a total weight of the premixed cement composition. Exemplary clays and thickeners may include, but are not limited to, cellulose ether, water soluble polymer, starch ethers, hydroxymethyl cellulose, hydroxyethyl cellulose, fibers, fumed silica, associative and alkali swellable thickeners, and combinations thereof.

The premixed cement composition may also include various other modifiers in amounts ranging from about 0 wt. % to about 20 wt. %, based on a total weight of the premixed cement composition. These modifiers may include, for example, defoamers present in an amount of about 0 wt. % to about 0.2 wt. %. Exemplary defoamers may include, but are not limited to, polyether chemistries, fatty acids, modified siloxanes, and combinations thereof. Modifiers may also include surfactants to decrease water surface tension, reduce viscosity, eliminate entrained air, and even stabilize the premixed cement formulations. In one or more embodiments the surfactants may include superplasticizers present in amounts ranging from about 0 wt. % to about 2 wt. %. Exemplary superplasticizers include, but are not limited to, polycarboxylate based water reducers, and the like.

The various embodiments of the present premixed cement compositions may also have other modifiers including, but not limited to, biocides, in-can preservatives, fibers/rheological modifiers, redispersible polymer powder, and combinations thereof. Biocides may be present in the premixed cement compositions in amounts of about 0 wt. % to about 0.02 wt. %. Biocides may include, but are not limited to, conventional powder and liquid based biocides, or combinations thereof. The in-can preservatives may also include conventional organic and/or inorganic preservatives in amounts of about 0.001 wt. % to about 0.002 wt. %.

The fibers and/or rheological modifiers may be included in the present premixed cement compositions in amounts of about 0 wt. % to about 0.2 wt. %. Exemplary fibers and/or rheological modifiers may include, but are not limited to, polymer fibers of different lengths, glass fibers of different lengths, and combinations thereof. The redispersible polymer powder may be present in the compositions in amounts of about 0 wt. % to about 10 wt. % to provide the compositions with increased flexibility, water resistance and compatibility with various hydraulic systems. Exemplary redispersible polymer powders may include, but are not limited to, styrene acrylic based polymer powders, styrene butadiene based polymer powders, and combinations thereof.

In certain embodiments of the invention, other modifiers may include inorganic pigments, inorganic fillers, water repellants, and combinations thereof. The inorganic pigments may be present in amounts of about 0 wt. % to about 4 wt. %. Exemplary inorganic pigments may include, but are not limited to, iron oxides, titanium dioxides, chrome oxides, and combinations thereof. Inorganic fillers may be present in amounts of about 0 wt. % to about 10 wt. %, with such exemplary fillers including limestone and/or dolomitic Limestone. The premixed cement formulations may also include water repellants, such as, lignosulphonates and/or polycarboxylates. The water repellants may be present in amounts of about 0 wt. % to about 2 wt. %.

Referring to FIGS. 1A-B, exemplary premixed cement formulations are shown that are suitable for use as cement-based adhesive and grout compositions in accordance with the invention. Preferably, the premixed cement formulations are premixed calcium aluminate cement formulations.

FIG. 1A shows a premixed cement formulation for a Ceramic Tile Adhesive "CTA" of the invention. In this embodiment, the first component premixed CTA cement formulation may include at least about 40 to 60 wt. % silica sand filler in combination with about 35 to 50 wt. % calcium aluminate slurry. The CTA cement formulation may also include one or more of the following: 0 to 0.45 wt. % cellulose ether; 0 to 0.1 wt. % defoamer; 0 to 2 wt. % fibers/rheological modifiers; 0 to 15 wt. % recycled light weight filler; 0 to 0.02 wt. % biocide; 0.001 to 0.002 wt. % in-can preservative; 0 to 1 wt. % clays and/or thickeners; 0 to 10 wt. % redispersible polymer powder; 0 to 2 wt. % superplasticizers, and any combination thereof. Again, it should be appreciated and understood that these CTA embodiments can comprise, consist of, and/or consist essentially of any of the foregoing ingredients/constituents.

The present premixed cement formulations may also be formulated as a premixed grout cement formulation. The table of FIG. 1B shows a premixed cement grout formulation of the invention. In this embodiment, the first component premixed cement grout formulation may include at least about 40 to 55 wt. % silica sand filler in combination with about 35 to 50 wt. % calcium aluminate slurry. The CTA cement formulation may also include one or more of the following: 0 to 0.45 wt. % cellulose ether; 0.01 to 0.2 wt. % defoamer; 0 to 2 wt. % fibers/rheological modifiers; 0 to 15 wt. % recycled light weight filler; 0 to 0.02 wt. % biocide; 0.001 to 0.002 wt. % in-can preservative; 0 to 1 wt. % clays and/or thickeners; 0 to 3 wt. % redispersible polymer powder; 0 to 2 wt. % superplasticizers, 0 to 4 wt. % inorganic pigments; 0 to 10 wt. % inorganic fillers (limestone); 0 to 2 wt. % water repellant; and any combination thereof. It should also be appreciated and understood that these premixed cement grout formulation embodiments can comprise, consist of, and/or consist essentially of any of the foregoing ingredients/constituents.

In accordance with the invention, the above first component (of the two-component part formulations) comprises a stabilized premixed cement slurry formulation having fillers and/or modifiers. These premixed cement slurry formulations are neutral slurries having a pH of about pH7, and are stable in slurry when fully formulated. The premixed cement slurries preferably have high freeze/thaw temperatures while maintaining a stable compound, which are formulated without other pozzolans (i.e., siliceous or siliceous and aluminous material, or materials capable of reacting with calcium hydroxide and water (e.g., volcanic tuff or ash used in making hydraulic cement)).

The various premixed cement slurry formulations, preferably premixed calcium aluminate cement slurries, are mixed with the second component part of the instant two-component part formulations. The second component part is an activation formulation rendered as an activator solution. The activator solution destabilizes the premixed cement slurry formulations to initiate the hydration process for the premixed cement slurries of the various CTA and/or grouts of the invention. The various embodiments of the invention use different combinations of alkalis to bring the premixed cement slurry formulations to a higher pH, thereby initiating reaction between these two-component parts of the instant compositions.

In accordance with one or more embodiments of the invention the activator solution may include, but is not limited to, one or more sodium hydroxide solutions at different concentrations, each saturated with different amounts of lithium carbonate at different concentrations within the solution as an activator. For instance, the activator solution may include sodium hydroxide solutions having sodium hydroxide concentrations of 3%, 5%, 7%, 14%, 21% or 28%, while such solutions are supersaturated with 2%, 4%, 6% and/or 8% of lithium carbonate as the activator. To activate the premixed cement slurry, the pH of the activator solution is preferably at or above 11.

Figure 3:
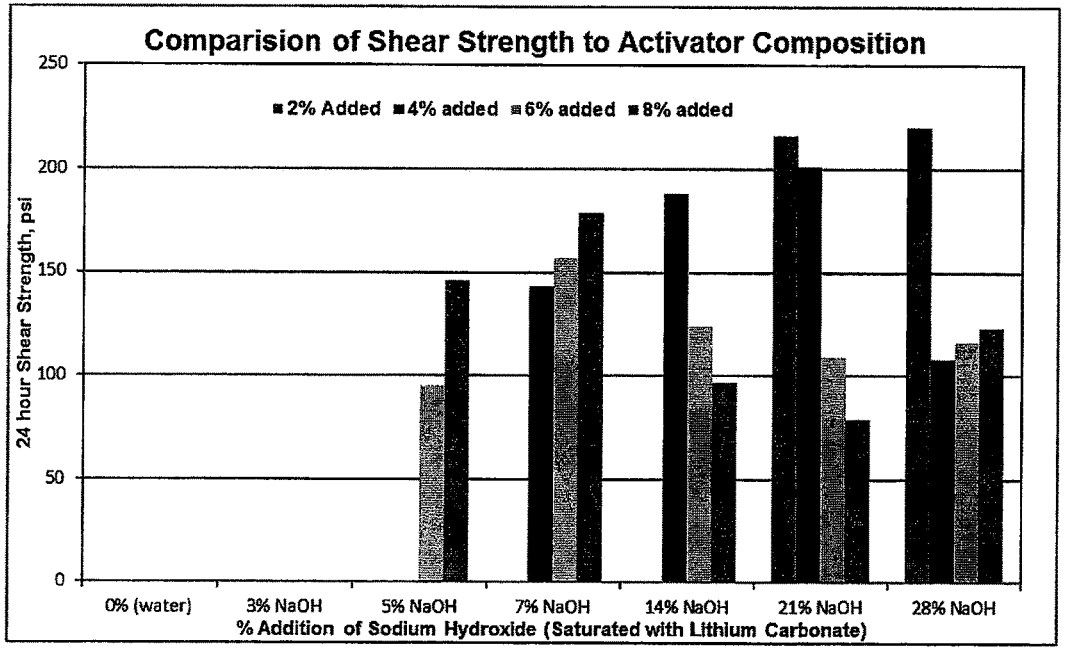
FIG. 3 is a plot comparison of vitreous tile shear strength (psi) as a function of concentration of the activator solution.

FIG. 2 shows plotted correlations between the above activator composition concentrations, addition levels and the raise in pH of CTA and/or grout formulation slurries of various embodiments of the invention. As is shown, solutions of sodium hydroxide are saturated with different concentrations of lithium carbonate activator. At each of the composition and addition levels the pH were recorded, and properties of applied various CTA and/or grouts of the invention measured. For instance, Plot 2 of FIG. 3 shows a comparison of vitreous tile shear strength (psi) as a function of concentration of the activator solution.

It has unexpectedly been found that the various CTA and/or grouts of the invention provide a continuous surface that is easy to keep clean. In the different embodiments of the present CTA and/or grouts, once applied to a substrate the dried products of the invention exhibit enhanced hardness, abrasion resistance and stain resistance over conventional premixed CTAs and grouts. Also, the instant CTA and/or grouts develop hardness of the final dried products at a fast rate as compared to conventional products. In the CTA embodiments of the invention the instant CTAs may be used as an adhesive to bond tiles to wood, concrete or any kind of flooring material. Key performance requirements of the CTAs of the invention are workability, open time and strength development.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A cement-based tiling composition for use as an adhesive or grout comprising:
   a premixed cementitious formulation having a pH, the premixed cementitious formulation including a cement slurry in an amount of about 35 wt. % to less than 50 wt. % in combination with at least one filler material present in an amount of about 40 wt. % to about 65 wt. % based on a total weight of the formulation, the cement slurry comprising an aluminous cement slurry or a calcium aluminate cement slurry; and
   an activation constituent that destabilizes the premixed cementitious formulation by increasing the pH thereof to generate a reaction between the premixed cementitious formulation and the activation constituent resulting in the cement-based tiling composition for use as an adhesive or a grout.

2. The cement-based tiling composition of claim 1 wherein the premixed cementitious slurry has a neutral pH.

3. The cement-based tiling composition of claim 2 wherein the premixed cementitious slurry is increased to a pH at or above 11.

4. The cement-based tiling composition of claim 1 wherein the activation constituent is an alkali activation constituent.

5. The cement-based tiling composition of claim 4 wherein the alkali constituent comprises a solution of sodium hydroxide saturated with lithium carbonate.

6. The cement-based tiling composition of claim 5 wherein the sodium hydroxide is present in the solution from about 3-15% and the lithium carbonate is present in the solution from about 2-8%.

7. The cement-based tiling composition of claim 1 wherein the premixed cementitious formulation further includes one or more of the following additives selected from the group consisting of thickeners, defoamers, surfactants, modifiers, biocide, preservatives, and plasticizers.

8. The cement-based tiling composition of claim 1 wherein the at least one filler material is silica sand present in an amount of about 40 wt. % to about 60 wt. %.

9. A cement-based tiling composition for use as an adhesive or grout consisting essentially of:
   a premixed cementitious formulation having a pH, the premixed cementitious formulation including a cement slurry in an amount of about 35 wt. % to less than 50 wt. % in combination with at least one filler material present in an amount of about 40 wt. % to about 65 wt. % based on a total weight of the formulation, the cement slurry comprising an aluminous cement slurry; and
   an alkali activation constituent that destabilizes the premixed cementitious formulation by increasing the pH thereof to generate a reaction between the premixed cementitious formulation and the alkali activation constituent resulting in the cement-based tiling composition for use as an adhesive or a grout.

10. The cement-based tiling composition of claim 9 wherein the alkali activation constituent comprises a solution of sodium hydroxide saturated with lithium carbonate.

11. The cement-based tiling composition of claim 10 wherein the sodium hydroxide is present in the solution from about 3-15% and the lithium carbonate is present in the solution from about 2-8%.

12. The cement-based tiling composition of claim 9 wherein the premixed cementitious formulation further includes one or more of the following additives selected from the group consisting of thickeners, defoamers, surfactants, modifiers, biocide, preservatives, and plasticizers.

13. A cement-based tiling composition comprising:
   a premixed cementitious formulation comprising;
     a first filler in an amount of about 40 to 60 wt. %,
     a cement slurry in an amount of about 35 to less than 50 wt. %, the cement slurry comprising an aluminous cement slurry or a calcium aluminate cement slurry,
     cellulose ether in an amount of about 0 to 0.45 wt. %,
     defoamer in an amount of about 0 to 0.1 wt. %, polymer fibers in an amount of about 0 to 2 wt. %,
a second filler being a recycled light weight filler in an amount of about 0 to 15 wt. %,
biocide in an amount of about 0 to 0.02 wt. %,
clays and/or thickeners in an amount of about 0 to 1 wt. %,
redispersible polymer powder in an amount of about 0 to 10 wt. %,
superplasticizers in an amount of about 0 to 2 wt. %, and an activator solution that destabilizes the premixed cementitious formulation by increasing the pH thereof to provide the cement-based tiling composition, the cement-based tiling composition suitable for use as an adhesive or a grout for tiling.

14. The cement-based tiling composition of claim 13 wherein the cement slurry includes calcium aluminate cement present in an amount of about 35 to 49 wt. % based on said total weight of the slurry.

15. The cement-based tiling composition of claim 13 wherein the cement slurry includes aluminous cement present in an amount of about 35 to less than 50 wt. % based on said total weight of the slurry.

16. The cement-based tiling composition of claim 13 wherein the activator solution is an alkali activator solution comprising a solution of sodium hydroxide saturated with lithium carbonate, the sodium hydroxide is present in the solution from about 3-15% and the lithium carbonate is present in the solution from about 2-8%.

* * * * *